US012695981B2

(12) United States Patent　　　　　(10) Patent No.: US 12,695,981 B2
Joo　　　　　　　　　　　　　　　　　　(45) Date of Patent: Jul. 28, 2026

(54) RECOVERY CIRCUIT AND AN IMAGE PROCESSING APPARATUS FOR DETECTING AND RECOVERING AN ABNORMAL SIGNAL

(71) Applicant: SAMSUNG ELECTRONICS CO., LTD., Suwon-si (KR)

(72) Inventor: Sookyung Joo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 224 days.

(21) Appl. No.: 18/370,423

(22) Filed: Sep. 20, 2023

(65) Prior Publication Data

US 2024/0179401 A1　　May 30, 2024

(30) Foreign Application Priority Data

Nov. 28, 2022　(KR) ........................ 10-2022-0162036

(51) Int. Cl.
　*H04N 23/60*　　(2023.01)
　*H04N 17/00*　　(2006.01)
　*H04N 23/667*　　(2023.01)
(52) U.S. Cl.
　CPC ........... *H04N 23/64* (2023.01); *H04N 17/002* (2013.01); *H04N 23/667* (2023.01)
(58) Field of Classification Search
　CPC ..... H04N 23/64; H04N 23/667; H04N 17/002
　USPC ........................................................ 348/187
　See application file for complete search history.

(56) References Cited

U.S. PATENT DOCUMENTS

| | | | |
|---|---|---|---|
| 7,450,153 B2 * | 11/2008 | Akada | H04N 23/68 |
| | | | 348/374 |
| 8,478,056 B2 | 7/2013 | Lee | |
| 8,629,913 B2 | 1/2014 | Cote et al. | |
| 8,750,388 B2 | 6/2014 | Okajima | |
| 8,823,689 B2 * | 9/2014 | Jang | G09G 5/363 |
| | | | 345/98 |
| 10,616,576 B2 | 4/2020 | Ameres | |
| 10,841,621 B2 | 11/2020 | Rombakh et al. | |
| 11,211,023 B2 * | 12/2021 | Fu | G09G 3/3688 |
| 2007/0164969 A1 * | 7/2007 | Kim | G09G 3/3611 |
| | | | 345/99 |
| 2021/0209390 A1 | 7/2021 | Chae et al. | |
| 2022/0246073 A1 | 8/2022 | Um et al. | |

FOREIGN PATENT DOCUMENTS

| | | |
|---|---|---|
| JP | 2002-369226 | 12/2002 |
| KR | 10-0630554 | 9/2006 |
| KR | 10-0844334 | 7/2008 |
| KR | 10-2012-0061543 | 6/2012 |

* cited by examiner

*Primary Examiner* — Trang U Tran
(74) *Attorney, Agent, or Firm* — Morgan, Lewis & Bockius LLP

(57)　　　　　ABSTRACT

A recovery circuit including: a first circuit configured to detect an abnormal signal based on an input signal and mask a signal subsequent to the abnormal signal when the input signal is detected as the abnormal signal; a second circuit configured to receive the abnormal signal from the first circuit, generate a fake signal in response to the abnormal signal, and transmit the fake signal to a processor; and a third circuit configured to generate a control signal and transmit the control signal to the processor; wherein the processor ignores the abnormal signal and performs an image processing operation based on the fake signal in response to the control signal.

18 Claims, 14 Drawing Sheets

Fake signal generation

RECOVERY CIRCUIT AND AN IMAGE PROCESSING APPARATUS FOR DETECTING AND RECOVERING AN ABNORMAL SIGNAL

CROSS-REFERENCE TO RELATED APPLICATION

This application claims priority under 35 U.S.C. § 119 to Korean Patent Application No. 10-2022-0162036, filed on Nov. 28, 2022, in the Korean Intellectual Property Office, the disclosure of which is incorporated by reference herein in its entirety.

TECHNICAL FIELD

The inventive concept relates to a recovery circuit, and more particularly, to a recovery circuit and an image processing apparatus for detecting and recovering an abnormal signal.

DISCUSSION OF RELATED ART

With the advancement of mobile devices such as smartphones, tablet PCs, etc., electronic devices incorporating multiple image sensors have become increasingly prevalent. An image processing apparatus typically includes an image signal processor designed to process input images generated by the image sensors.

Currently, when transmitting image data from multiple image sensors to a processor in a mobile device, any occurrence of errors in some frames of the image data from one sensor require the entire processor to be initialized. Since it takes a lot of time to reset after the entire initialization, issues during video recording or preview operations may occur. Accordingly, there is a need for a recovery circuit and an image processing apparatus that can selectively disregard erroneous frames of image data while processing the subsequent normal frames without requiring complete initialization.

SUMMARY

The inventive concept provides a recovery circuit, an image processing apparatus and a method of operating the image processing apparatus, wherein the method includes detecting and recovering an error in some frames of image data and normally processing a frame subsequent to an erroneous frame without having to initialize the entire apparatus.

According to an embodiment of the inventive concept, there is provided a recovery circuit including: a first circuit configured to detect an abnormal signal based on an input signal and mask a signal subsequent to the abnormal signal when the input signal is detected as the abnormal signal; a second circuit configured to receive the abnormal signal from the first circuit, generate a fake signal in response to the abnormal signal, and transmit the fake signal to a processor; and a third circuit configured to generate a control signal and transmit the control signal to the processor; wherein the processor ignores the abnormal signal and performs an image processing operation based on the fake signal in response to the control signal.

According to an embodiment of the inventive concept, there is provided a method of operating an image processing apparatus including an image sensor, the method including: receiving an input signal including a plurality of frame sections from the image sensor and detecting an abnormal signal in a first frame section of the input signal; masking a second frame section of the input signal when the abnormal signal is detected in the first frame section; generating a fake signal corresponding to the first frame section after masking the second frame section, and generating an output image in response to the fake signal, wherein the second frame section is received after the fake signal is terminated, and wherein the second frame section is subsequent to the first frame section.

According to an embodiment of the inventive concept, there is provided an image processing apparatus including: an image sensor configured to generate image data including a plurality of frame sections; a recovery circuit configured to receive the image data from the image sensor and generate output data based on the image data; and a processor configured to generate an output image based on the output data; wherein the recovery circuit includes a first circuit configured to detect an abnormal signal based on a first frame section of the image data and mask a second frame section when the first frame section is detected as the abnormal signal, a second circuit configured to receive the first frame section from the first circuit and generate a fake signal based on the first frame section; and a third circuit configured to generate a control signal; wherein the output data includes the first frame section, the fake signal, and the control signal, wherein the second frame section is subsequent to the first frame section, and wherein the processor ignores the first frame section and performs an image processing operation based on the fake signal in response to the control signal.

BRIEF DESCRIPTION OF THE DRAWINGS

Embodiments of the inventive concept will be more clearly understood from the following detailed description taken in conjunction with the accompanying drawings in which:

FIG. 1 is a block diagram schematically illustrating an image processing apparatus according to an embodiment;

FIG. 5 is a block diagram illustrating an implementation of an image processing apparatus according to an embodiment;

FIG. 6 is a graph for describing a fourth circuit for generating a renewed fake signal according to an embodiment;

DETAILED DESCRIPTION OF THE EMBODIMENTS

Figure 1:
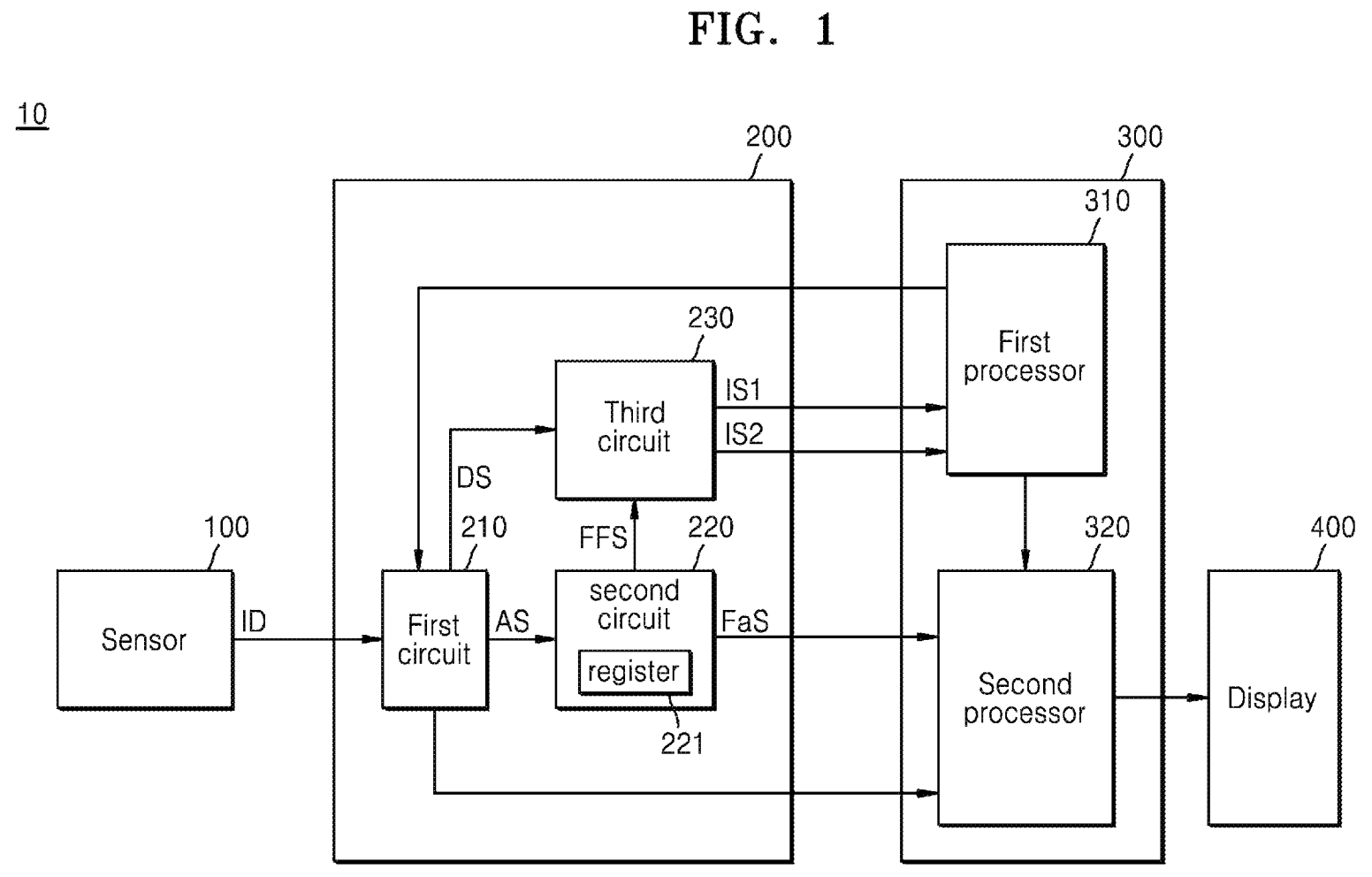
Figure 2A:
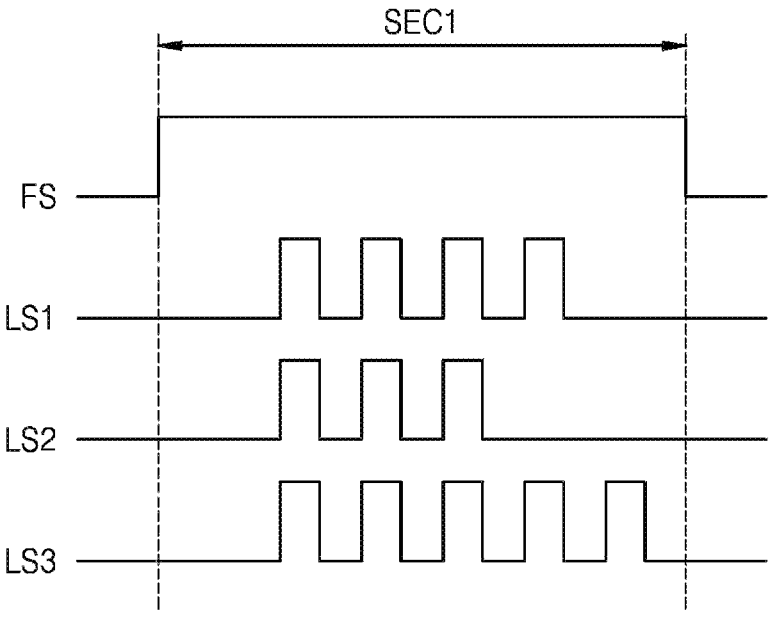
FIGS. 2A, 2B, 2C, 2D and 2E are graphs for describing a signal applied to a first circuit for detecting an abnormal signal according to an embodiment.

FIG. 1 is a block diagram schematically illustrating an image processing apparatus 10 according to an embodiment.

Referring to FIG. 1, the image processing apparatus 10 may be an electronic apparatus configured to capture an image, display the captured image, or perform a captured image-based operation. The image processing apparatus 10 may be, for example, a personal computer (PC), an Internet of Things (IOT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, and the like. In addition, the image processing apparatus 10 may be included in an electronic device such as a drone and an advanced driver assistance system (ADAS), or an electronic device provided as a part of a vehicle, furniture, manufacturing equipment, a door, various measuring devices, or the like.

The image processing apparatus 10 may include an image sensor 100, a recovery circuit 200, a processor 300, and a display 400.

The image sensor 100 may be implemented as an image sensor chip or a camera module. The image sensor 100 may convert an optical signal reflected from an object into electrical signals, and generate and output image data based on the electrical signals. For example, the image sensor 100 may include a pixel array including a plurality of unit pixels arranged in a two-dimensional configuration. The image sensor 100 may further include components such as, a correlated double sampler that samples the electrical signals generated by the pixel array from the optical signal, an analog-to-digital converter that converts an analog signal provided from the correlated double sampler into a digital signal, and a latch that outputs the digital signal. Additionally, the image sensor 100 may include a signal processor, and relevant components to complete its functionality.

The image sensor 100 may transmit image data ID through a mobile industry processor interface (MIPI), a camera serial interface (CSI), or the like. The image data ID may include a frame signal including a plurality of frame sections, a line signal including at least one line section, and a pixel signal including at least one pixel section. Some embodiments thereof will be described later with reference to FIGS. 2A to 2E.

The recovery circuit 200 may receive image data ID from the image sensor 100, and detect an abnormal signal based thereon. In other words, the recovery circuit 200 may determine if the image data ID is an abnormal signal. When the abnormal signal is detected, the recovery circuit 200 may cause the processor 300 to ignore image data ID detected as the abnormal signal. For example, the recovery circuit 200 may generate and transmit a fake signal FaS to the processor 300. When the abnormal signal is not detected, the recovery circuit 200 may send the image data ID to the processor 300. The recovery circuit 200 may include a first circuit 210, a second circuit 220 and a third circuit 230.

The first circuit 210 may receive the image data ID from the image sensor 100 as an input signal, and may detect an abnormal signal based on the image data ID. Some embodiments thereof will be described later with reference to FIGS. 2A to 2E.

When the image data ID is detected as an abnormal signal, the first circuit 210 may operate in a first mode to mask the subsequent signal of the image data ID, which is detected as an abnormal signal. In an embodiment of the inventive concept, masking may refer to an operation, performed by the first circuit 210, of blocking an input signal. In other words, the first circuit 210 may block the image data ID when it is determined to be abnormal. Further, the first circuit 210 may transmit an abnormal signal AS of the image data ID to the second circuit 220. In some embodiments, the image data ID may include a plurality of frame sections, and the first circuit 210 may detect an abnormal signal based on each of the frame sections. In other words, the first circuit 210 may check to see if an abnormal signal exists for each of the frame sections. When a particular frame section of the plurality of frame sections is detected as an abnormal signal, the first circuit 210 may mask the subsequent frame of the particular frame section and transmit the particular frame section that was detected as the abnormal signal AS to the second circuit 220. For example, the image sensor 100 may continuously send image data ID including a plurality of frame sections to the first circuit 210. When an error occurs in a particular frame section among the plurality of frame sections, a collision may occur when the first circuit 210 receives a subsequent frame section before recovering the error in the particular frame section. During the recovery process of the particular frame section with the error, the first circuit 210 may mask the subsequent frame following the particular frame section in which the error occurred. This masking process prevents any collision between the frame section with the error and subsequent frame sections.

When the image data ID is not detected as an abnormal signal, the first circuit 210 may operate in a second mode to send the image data not detected as an abnormal signal only to the processor 300. In this case, the first circuit 210 may not communicate with second and third circuits 220 and 230. In some embodiments, the image data ID may include a plurality of frame sections, and the first circuit 210 may detect an abnormal signal based on each of the frame sections. When the frame section is not detected as an abnormal signal, the first circuit 210 may transmit the frame section to the processor 300 without transmitting the frame section to the second circuit 220 since it is not necessary to recover the error in the frame section. For example, the first circuit 210 may transmit the frame section to a second processor 320.

When the first circuit 210 operates in the first mode, the second circuit 220 may receive the abnormal signal AS and generate the fake signal FaS based on the abnormal signal AS. Some embodiments thereof will be described with reference to FIG. 3. The second circuit 220 may transmit the generated fake signal FaS to the processor 300. For example, the second circuit 220 may transmit the fake signal FaS to the second processor 320.

The second circuit 220 may include a register 221. In some embodiments, the register 221 may store data for a normal frame section corresponding to a particular frame section detected as an abnormal signal AS. Some embodiments thereof will be described with reference to FIGS. 2A to 2E.

The third circuit 230 may generate and transmit a control signal to the processor 300. In some embodiments, the control signal may include a first interrupting signal IS1. For example, when the first circuit 210 detects a particular frame section as an abnormal signal AS, the third circuit 230 may receive a signal DS from the first circuit 210, wherein the signal DS indicates that the abnormal signal AS has been detected. Subsequently, the third circuit 230 may notify the processor 300 about the detection of the particular frame section as the abnormal signal AS by generating the first interrupting signal IS1 based on this information and providing the first interrupting signal IS1 to a first processor 310. In some embodiments, the control signal may include a second interrupting signal IS2. For example, when the fake signal FaS generated by the second circuit 220 is terminated, the third circuit 230 may receive a signal FFS indicating that the fake signal FaS has been terminated, and may notify the first processor 300 of the termination of the fake signal FaS through the second interrupting signal IS2 generated based thereon.

The recovery circuit 200 is described as being separate from the processor 300, but it is not limited thereto. In some embodiments, the recovery circuit 200 may be integrated with the processor 300 to form a chip, e.g., a system-on-chip (SoC), which may be an application processor(AP).

The processor 300 may include the first processor 310 and the second processor 320. In some embodiments, the first processor 310 may execute a program including instructions. The program may include a plurality of subprograms, and a subprogram may be a subroutine, a routine, a procedure, a function, etc. The first processor 310 may include a plurality of cores, each of which may independently process instructions. For example, the first processor 310 may be a central processing unit (CPU), and the plurality of cores may be CPU cores.

The second processor 320 may be an image signal processor (ISP). In some embodiments, the second processor 320 may receive a fake signal FaS from the second circuit 220 when the first circuit 210 operates in the first mode, and may receive image data that is not an abnormal signal AS from the first circuit 210 when the first circuit 210 operates in the second mode. The second processor 320 may process image data on the fly that is not a received fake signal FaS or an abnormal signal AS. For example, the second processor 320 may perform image signal processing for improving image quality such as noise reduction, gamma correction, color filter array interpolation, color matrix, color correction, and color enhancement of image data that is not a fake signal FaS or an abnormal signal AS. In addition, image data generated by image signal processing for improving image quality may be subjected to compression processing to generate an image file, or image data may be restored from the image file.

In some embodiments, the first processor 310 may receive the first interrupting signal IS1 from the third circuit 230, and may control the second processor 320 based thereon. In other words, the first processor 310 may control the second processor 320 in response to the first interrupting signal IS1. For example, the second processor 320 may not perform the above-described image processing operation based on the abnormal signal AS and may abnormally terminate. When terminated abnormally, the second processor 320 may perform a subsequent image processing operation after being initialized. Therefore, the first processor 310 may receive the first interrupting signal IS1, and may control the second processor 320 to ignore the abnormal signal AS.

In some embodiments, the first processor 310 may receive the second interrupting signal IS2 from the third circuit 230, and may control the first circuit 210 based thereon. For example, when the fake signal FaS generated by the second circuit 220 is terminated, an error in a particular frame section may be recovered. After the error in the particular frame section is restored (e.g., recovered), collision may not occur even in the case where the first circuit 210 receives a frame section subsequent to the particular frame section. As a result, the first processor 310 may transmit a signal corresponding to the second interrupting signal IS2 to the first circuit 210. The first circuit 210 may receive a frame section subsequent to the particular frame section without masking the subsequent frame based on the signal corresponding to the second interrupting signal IS2.

The display 400 may include a display panel. The display panel may receive output data from the processor 300 and display an image corresponding to the output data. The display panel is a display unit for displaying actual images, and may be one of display devices for displaying two-dimensional images by receiving electrically transmitted image signals, such as an organic light emitting diode (OLED) display, a thin film transistor-liquid crystal display (TFT-LCD), a field emission display, and a plasma display panel (PDP). For example, the display 400 may receive output data generated by the second processor 320 performing an image processing operation, and display images based on the output data.

FIGS. 2A-2E are graphs for describing a signal applied to a first circuit for detecting an abnormal signal according to an embodiment. Referring to FIG. 1, the first circuit 210 may receive image data ID as an input signal from the image sensor 100, and the image data ID may include a frame signal including a plurality of frame sections, a line signal including at least one line section, and a pixel signal including at least one pixel section. For example, the frame section may be a section from when the frame signal transitions from a first level (e.g., logic low) to a second level (e.g., logic high) to when the frame signal transitions from the second level to the first level. The line section may be a section from when the line signal transitions from the first level to the second level to when the line signal transitions from the second level to the first level. The pixel section may be a section from when the pixel signal transitions from the first level to the second level to when the pixel signal transitions from the second level to the first level.

In some embodiments, the first circuit 210 may detect the abnormal signal AS based on each of the plurality of frame sections of the image data ID. For example, the first circuit 210 may detect the abnormal signal AS based on a first frame section of the image data ID, and may mask a second frame section that is subsequent to the first frame section when the first frame section is detected as the abnormal signal AS. When the first frame section is not detected as an abnormal signal AS, the second frame section may be received and provided to the processor 300.

In some embodiments, further referring to FIG. 2A, when the number of line sections corresponding to one of the plurality of frame sections is less than or greater than the threshold number, the first circuit 210 may detect the image data ID as an abnormal signal AS. In an embodiment of the inventive concept, the threshold number may be the data requested by the second processor 320, and the data requested by the second processor 320 may refer to a particular number of line sections corresponding to a particular frame section. Hereinafter, the data requested by the second processor 320 indicates that four line sections correspond to a particular frame section SEC1, but is not limited thereto. For example, N (N is an integer greater than or equal to 1) line sections may correspond to the particular frame section SEC1, and the threshold number may be N.

In some embodiments, the number (e.g., four) of the line sections of a first line signal LS1 may be the same as the threshold number (e.g., four) corresponding to the frame section SEC1 of the frame signal FS, and the first circuit 210 may not detect the frame section SEC1 as an abnormal signal AS. The number of the line sections (e.g., three) of a second line signal LS2 may be smaller than the threshold number corresponding to the frame section SEC1 of the frame signal FS, and the first circuit 210 may detect the frame section SEC1 as an abnormal signal AS. The number (e.g., five) of the line sections of a third line signal LS3 may be greater than the threshold number (e.g., four) corresponding to the frame section SEC1 of the frame signal FS, and the first circuit 210 may detect the frame section SEC1 as an abnormal signal AS.

Figure 2B:
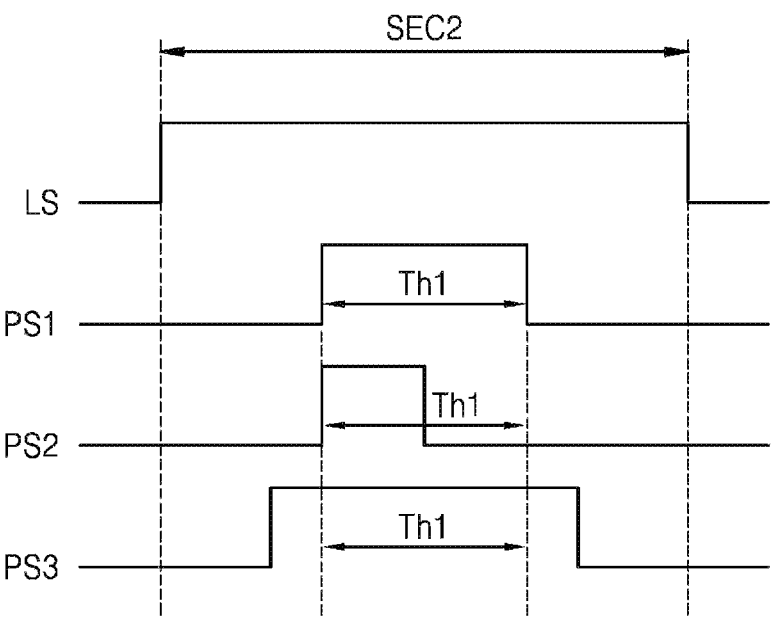

In some embodiments, further referring to FIG. 2B, the first circuit 210 may detect the image data ID as the abnormal signal AS when the amount of data of the pixel section corresponding to the line section is less than or greater than the threshold amount of data. In an embodiment of the inventive concept, the threshold amount of data may be data requested by the second processor 320, and the data requested by the second processor 320 may be the amount of data of the pixel section corresponding to the particular line section. The amount of data of the pixel section may be proportional to a length of the pixel section. For example, as the length of the pixel section increases, the amount of data of the pixel section may increase. Thus, the amount of data of the pixel section may be referred to as the length of the pixel section. Hereinafter, the data requested by the second processor 320 indicates the data amount of the pixel section that corresponds to the particular line section SEC2, but is not limited thereto. For example, the data requested by the second processor 320 may be larger or shorter than a threshold data amount Th1 corresponding to the particular line section SEC2.

In some embodiments, the data amount of the pixel section of the first pixel signal PS1 may be the same as the threshold data amount Th1 corresponding to the line section SEC2 of the line signal LS, and the first circuit 210 may not detect the frame section corresponding to line section SE2 as an abnormal signal AS. The data amount of the pixel section of the second pixel signal PS2 may be less than the threshold data amount Th1 corresponding to the line section SEC2 of the line signal LS, and the first circuit 210 may detect the frame section corresponding to the line section SEC2 as an abnormal signal AS. The data amount of the pixel section of a third pixel signal PS3 may be greater than the threshold data amount Th1 corresponding to the line section SEC2 of the line signal LS, and the first circuit 210 may detect the frame section corresponding to line section SEC2 as an abnormal signal AS.

Figure 2C:
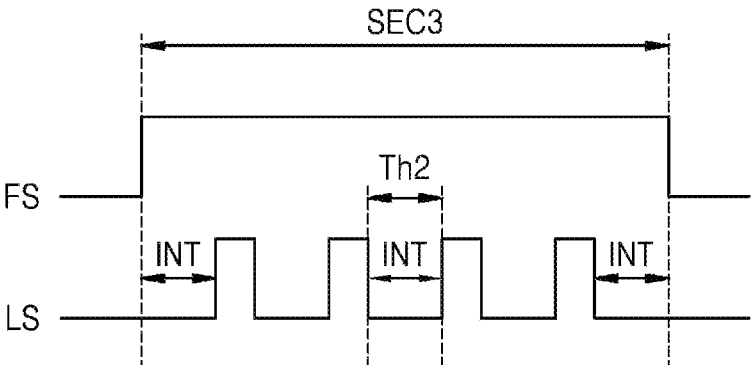

In some embodiments, further referring to FIG. 2C, when an interval between line sections corresponding to one frame section among the plurality of frame sections is shorter or longer than a threshold interval, the first circuit 210 may detect the image data ID as an abnormal signal AS. In an embodiment of the inventive concept, the threshold interval may be the data requested by the second processor 320, and the data requested by the second processor 320 may be an interval between the line sections corresponding to a particular frame section. Hereinafter, the data requested by the second processor 320 indicates an interval between the line sections corresponding to a particular frame section SEC3, but is not limited thereto. For example, the data requested by the second processor 320 identify an interval between the line sections corresponding to the particular frame section SEC3 that is longer or shorter than a threshold interval Th2.

In some embodiments, when an interval INT between the line sections of the line signal LS corresponding to the frame section SEC3 of the frame signal FS is equal to the threshold interval Th2, the first circuit 210 may not detect the frame section SEC3 as an abnormal signal AS. When the interval INT between the line sections of the line signal LS corresponding to the frame section SEC3 of the frame signal FS is shorter or longer than the threshold interval Th2, the first circuit 210 may detect the frame section SEC3 as an abnormal signal AS.

Figure 2D:
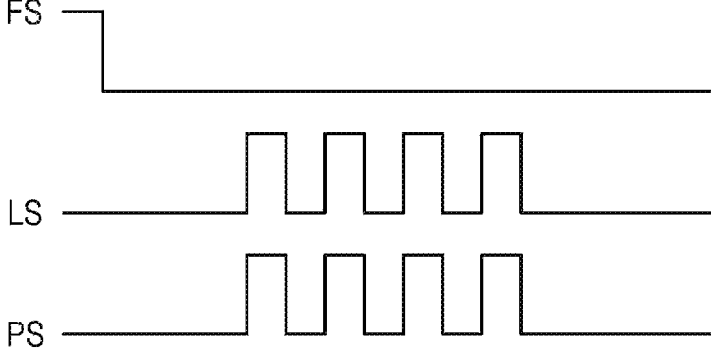

In some embodiments, further referring to FIG. 2D, the first circuit 210 may detect the image data ID as an abnormal signal AS when there is a line section of the line signal or a pixel section of the pixel signal in a section other than one of the plurality of frame sections. For example, when the frame signal FS is at the first level, there may be a line section of the line signal LS or a pixel section of the pixel signal PS, and the first circuit 210 may detect the image data ID as an abnormal signal AS.

Figure 2E:
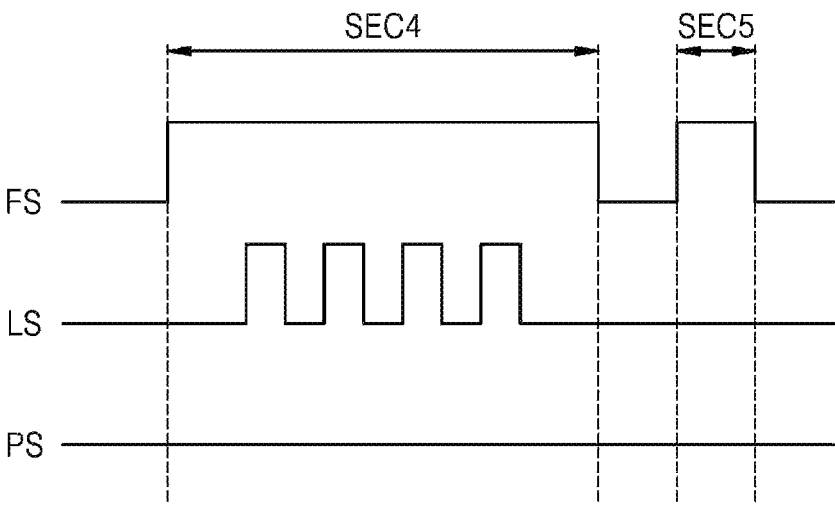

In some embodiments, further referring to FIG. 2E, when there is no line section or pixel section corresponding to one of the plurality of frame sections, the first circuit 210 may detect the image data ID as an abnormal signal AS. For example, when there is a line section of the line signal LS corresponding to a frame section SEC4 of the frame signal FS, but there is no pixel section of the pixel signal PS corresponding to the frame section SEC4, then the first circuit 210 may detect the frame section SEC4 as an abnormal signal AS. When there is no line section of the line signal LS and no pixel section of the pixel signal PS corresponding to a frame section SEC5 of the frame signal FS, the first circuit 210 may detect the frame section SEC5 as an abnormal signal AS.

In some embodiments, the register 221 may store data of a normal frame section corresponding to a particular frame section detected as an abnormal signal AS. For example, the data of the normal frame section may include data of the restored frame section, a threshold number of line sections corresponding to the particular frame section (e.g., the number (four) of line sections of the first line signal LS1 in FIG. 2A), a threshold amount of data of a pixel section corresponding to a particular line section (e.g., Th1 in FIG. 2B), or a threshold interval between line sections corresponding to the particular frame section (e.g., Th2 in FIG. 2C).

Figure 3:
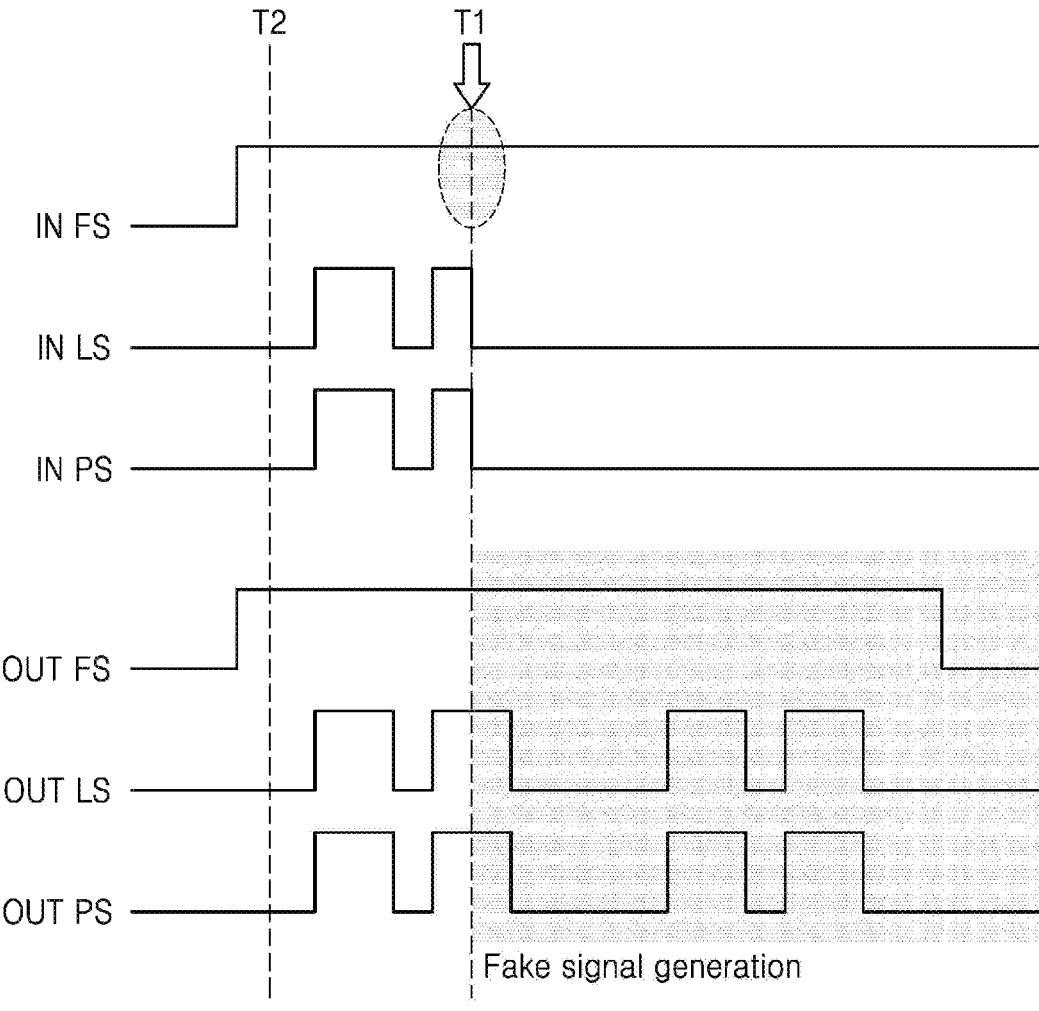
FIG. 3 is a graph for explaining a fake signal generated by a second circuit according to an embodiment.

FIG. 3 is a graph for explaining a fake signal generated by a second circuit according to an embodiment.

Referring to FIGS. 1 and 3, the second circuit 220 may include the register 221. In some embodiments, the second circuit 220 may generate, using the register 221, data subsequent to the time point when the first circuit 210 detects the image data ID as an abnormal signal AS based on the data prior to the time point when the first circuit 210 detects the image data ID as an abnormal signal AS, and the generated data may be referred to as a fake signal FaS. For example, the first circuit 210 may receive input image data including an input frame signal IN FS, an input line signal IN LS, and an input pixel signal IN PS. The first circuit 210 may detect the input image data as an abnormal signal AS at a T1 time point, and the second circuit 220 may receive the abnormal signal AS. The register 221 may store data of the normal frame section described above in FIGS. 2A to 2E. The second circuit 220 may compare the data of the normal frame section stored in the register 221 with the input image data prior to the T1 time point to generate the fake signal FaS which is the normal data subsequent to the T1 time point. For example, the fake signal FaS may include an output frame signal OUT FS, an output line signal OUT LS, and an output pixel signal OUT PS.

In some embodiments, even when the data prior to the time point when an abnormal signal AS is detected only includes a frame signal, the second circuit 220 may generate, using the register 221, data subsequent to the time point when an abnormal signal AS is detected. For example, the first circuit 210 may detect the input image data as an abnormal signal AS at a T2 time point, and the second circuit 220 may receive the abnormal signal AS. The second circuit 220 may compare the input frame signal IN FS with the data stored in the register 221 to generate a fake signal FaS which is normal data subsequent to the T2 time point.

Figure 4:
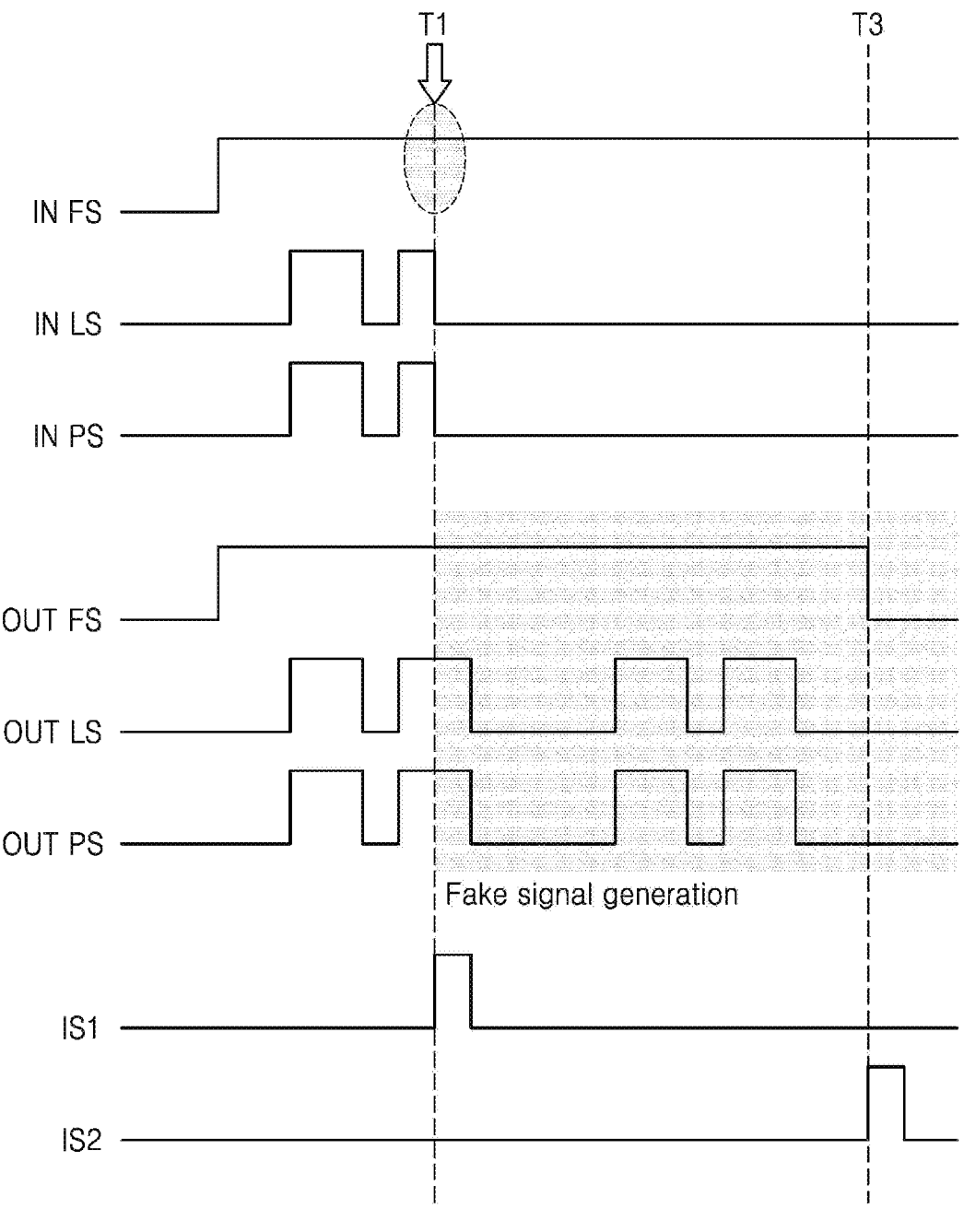
FIG. 4 is a graph for explaining a control signal generated by a third circuit according to an embodiment.

FIG. 4 is a graph for explaining a control signal generated by a third circuit according to an embodiment.

Referring to FIG. 1 and FIG. 4, the third circuit 230 may generate the first interrupting signal IS1 based on the operation of the first circuit 210, and generate the second interrupting signal IS2 based on the operation of the second circuit 220. In some embodiments, the T1 time point may be a time point when the first circuit 210 detects the input image data as the abnormal signal AS, as described above in FIG. 3. At the T1 time point, the third circuit 230 may receive a signal DS indicating the detection of the abnormal signal AS from the first circuit 210, and generate the first interrupting signal IS1. The third circuit 230 may transmit the generated first interrupting signal IS1 to the first processor 310 to inform the first processor 310 that the frame section of the input frame signal IN FS including the T1 time point is an abnormal signal AS.

In some embodiments, as described above in FIG. 3, the second circuit 220 may produce a fake signal FaS at the T1 time point, and the fake signal FaS may be terminated at a T3 time point. The third circuit 230 may receive a signal FFS indicating that the fake signal is terminated from the second circuit 220 at the T3 time point and may generate the second interrupting signal IS2. The third circuit 230 may send the generated second interrupting signal IS2 to the first processor 310 to inform the first processor 310 that the fake signal FaS is terminated at the T3 time point.

Figure 5:
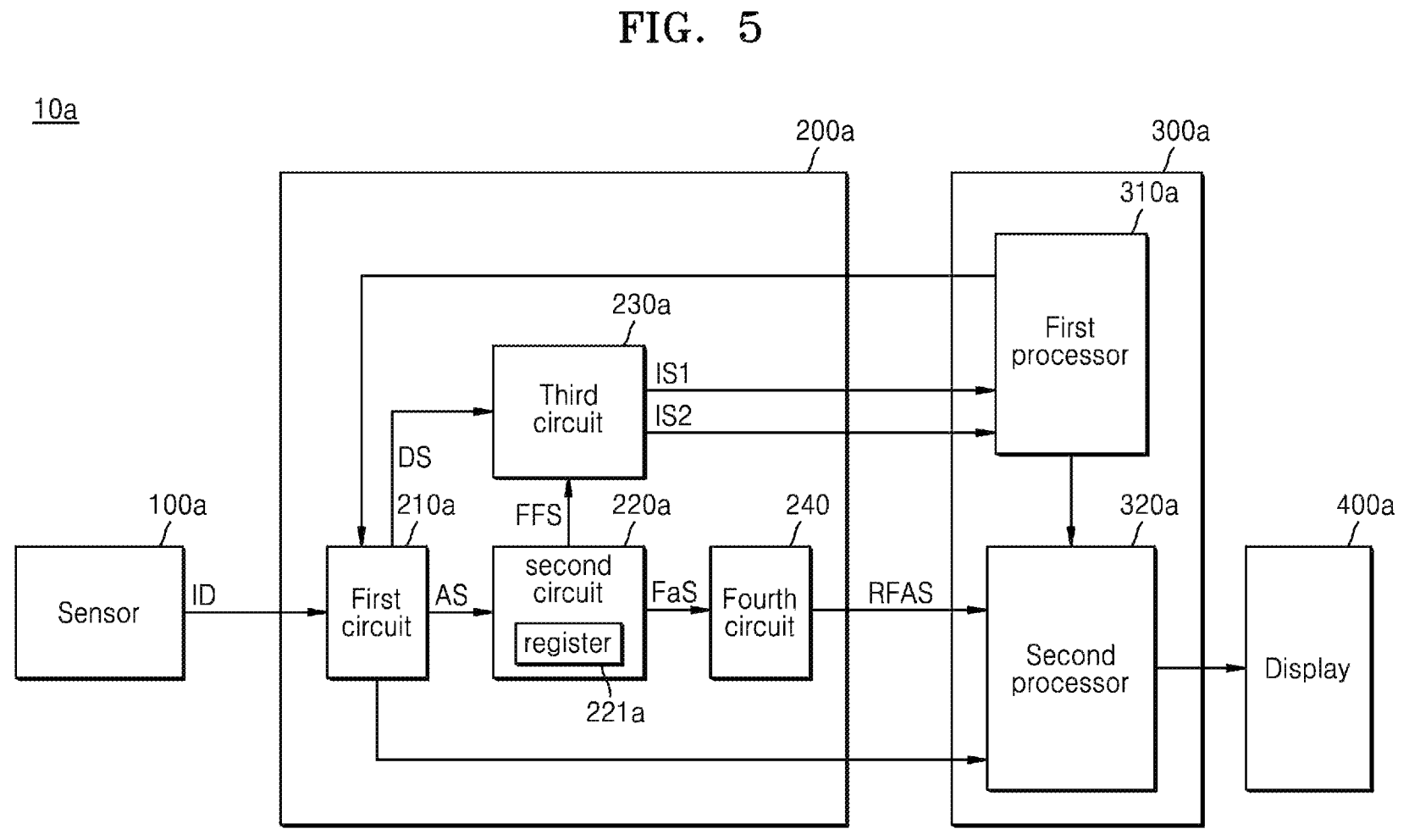

FIG. 5 is a block diagram illustrating an implementation of an image processing apparatus according to an embodiment. Referring to FIG. 5, an image processing apparatus 10a may include an image sensor 100a, a recovery circuit 200a, a processor 300a, and a display 400a. The image sensor 100a, the processor 300a, and the display 400a in FIG. 5 may be the same as the image sensor 100, the processor 300, and the display 400 in FIG. 1, and overlapping descriptions with those in FIG. 1 will be omitted.

The recovery circuit 200a may include a first circuit 210a, a second circuit 220a, a third circuit 230a, and a fourth circuit 240. The first circuit 210a, the second circuit 220a, and the third circuit 230a in FIG. 5 may be the same as the first circuit 210, the second circuit 220, and the third circuit 230 in FIG. 1. However, descriptions overlapping with those in FIG. 1 will be omitted.

The fourth circuit 240 may receive the fake signal FaS from the second circuit 220a, and may generate a renewed fake signal RFaS based on the fake signal FaS. Further, the fourth circuit 240 may transmit the renewed fake signal RFaS to the second processor 320a. In some embodiments, the performance of the image processing apparatus 10a may be improved when the second processor 320a receives data of a preset standard as an input Some embodiments thereof will be described with reference to FIG. 6.

Figure 6:
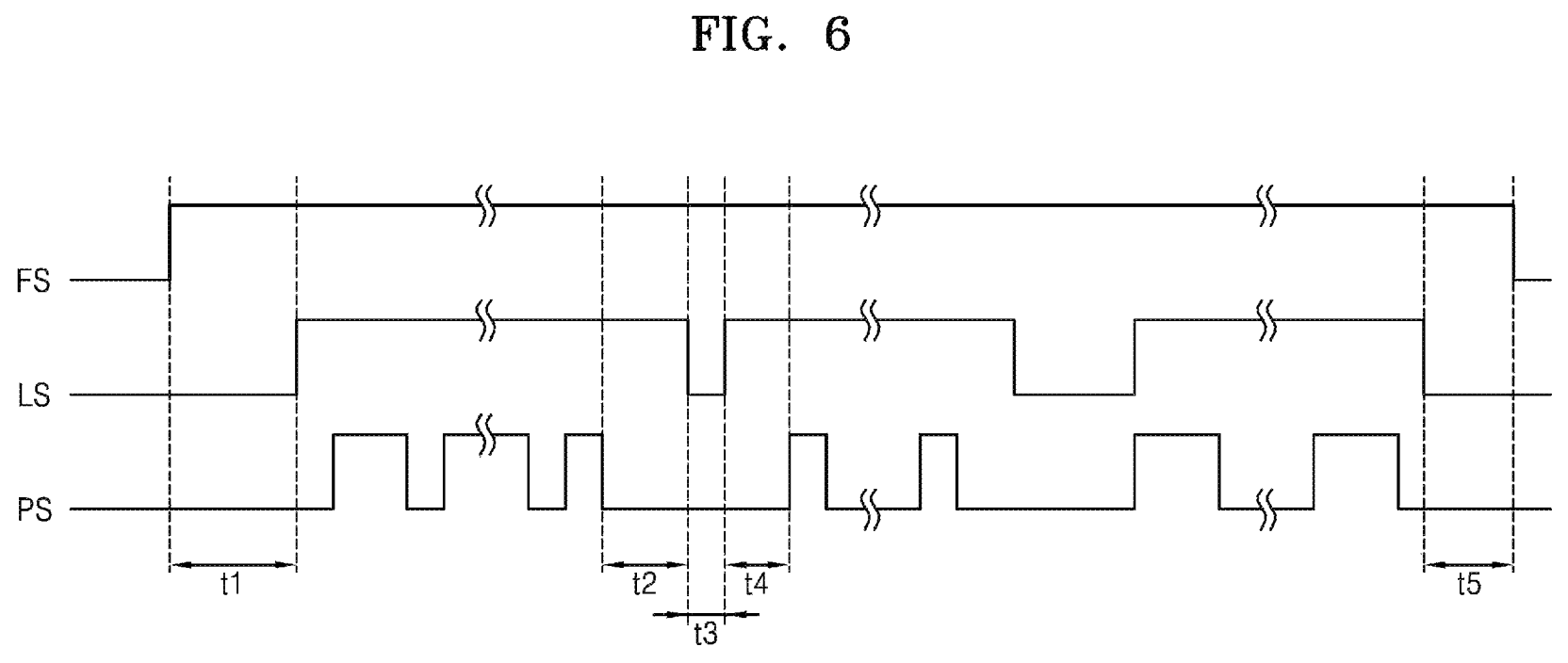

FIG. 6 is a graph for describing a fourth circuit for generating a renewed fake signal according to an embodiment. Referring to FIGS. 5 and 6, the graph of FIG. 6 may show an example of the fake signal FaS generated by the second circuit 220a. The fake signal FaS may include a frame signal FS, a line signal LS, and a pixel signal PS. Hereinafter, for convenience, the fake signal will be described as including, but not limited to, one frame section, three line sections, and seven pixel sections. For example, the fake signal may include a plurality of frame sections, at least one line section, and at least one pixel section.

The fake signal FaS generated by the second circuit 220a may have a different standard of data requested by the second processor 320a. Some embodiments thereof will be described hereinafter.

In some embodiments, the second processor 320a may request a certain interval from the time at which the frame signal FS transitions from the first level to the second level to the time at which the line signal LS transitions from the first level to the second level. For example, a t1 interval in FIG. 6 may be shorter or longer than a certain interval requested by the second processor 320a, and the fourth circuit 240 may renew the fake signal FaS by adjusting the t1 interval to meet the certain interval requested by the second processor 320a.

In some embodiments, the second processor 320a may request a certain interval from the time at which the pixel signal PS transitions from the second level to the first level to the time at which the line signal LS transitions from the second level to the first level. For example, a t2 interval in FIG. 6 may be shorter or longer than a certain interval requested by the second processor 320a, and the fourth circuit 240 may renew the fake signal FaS by adjusting the t2 interval to meet the certain interval requested by the second processor 320a.

In some embodiments, the second processor 320a may request a certain interval from the time at which the line signal LS transitions from the second level to the first level to the time at which the line signal LS transitions from the first level to the second level. For example, a t3 interval in FIG. 6 may be shorter or longer than the certain interval requested by the second processor 320a, and the fourth circuit 240 may renew the fake signal FaS by adjusting the t3 interval to meet the certain interval requested by the second processor 320a.

In some embodiments, the second processor 320a signal may request a certain interval from the time at which the line signal LS transitions from the first level to the second level to the time at which the pixel signal PS transitions to the first level to the second level. For example, a t4 interval in FIG. 6 may be shorter or longer than the certain interval requested by the second processor 320a, and the fourth circuit 240 may renew the fake signal FaS by adjusting the t4 interval to meet the certain interval requested by the second processor 320a.

In some embodiments, the second processor 320a may request a certain interval from the time at which the line signal LS transitions from the second level to the first level to the time at which the frame signal FS transitions to the second level to the first level. For example, a 15 interval in FIG. 6 may be shorter or longer than the certain interval requested by the second processor 320a, and the fourth circuit 240 may renew the fake signal FaS by adjusting the t5 interval to meet the certain interval requested by the second processor 320a.

In some embodiments, since the fourth circuit 240 renews the fake signal FaS by adjusting the frame signal FS, the line signal LS or the pixel signal PS to meet the standard of the input data requested by the second processor 320a, the quality of output data image generated by the second processor 320a based on the renewed fake signal RFaS may be improved rather than the quality of output data image generated by the second processor 320 based on the fake signal FaS.

Figure 7:
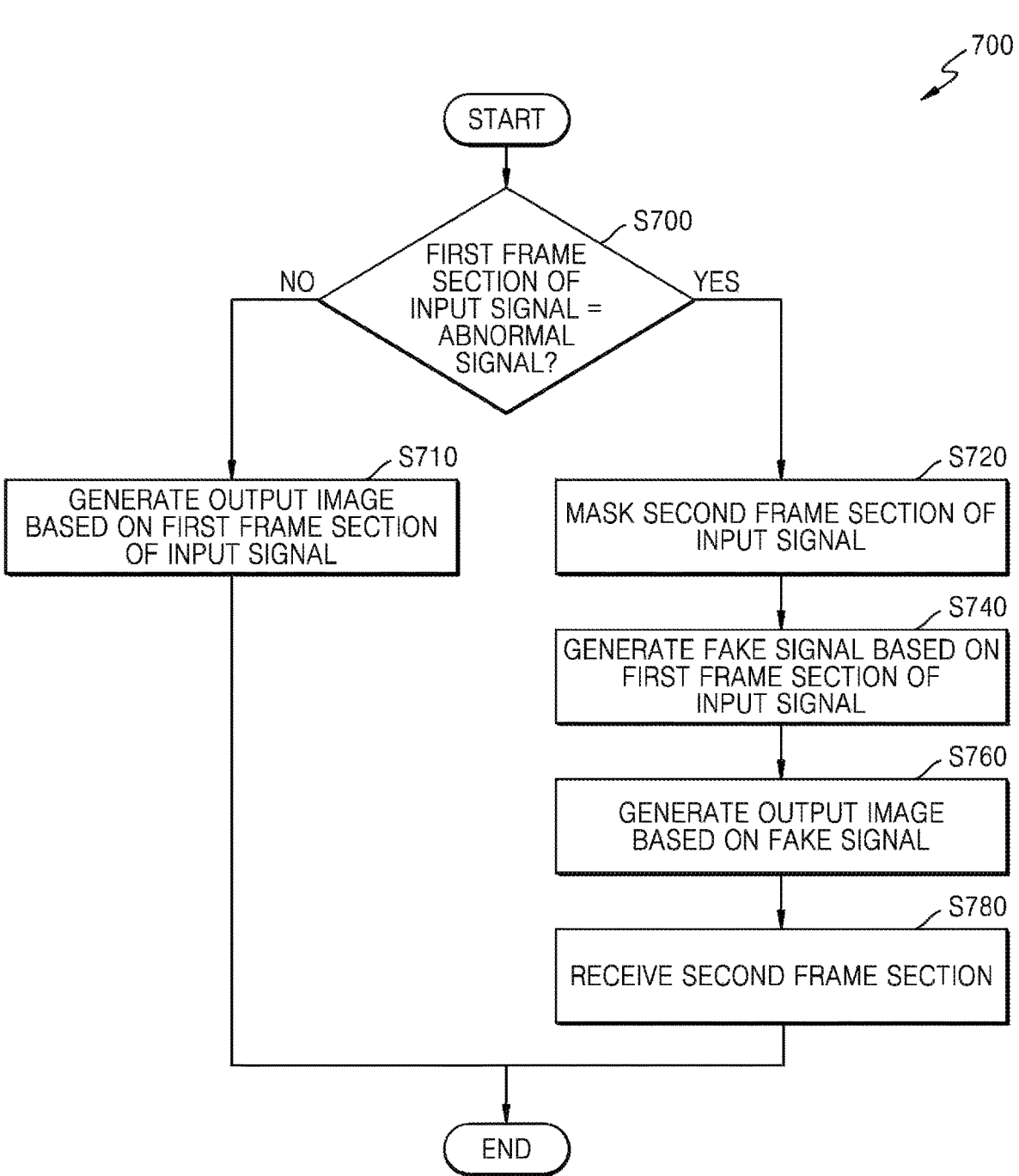
FIG. 7 is a flowchart illustrating a method of operating an image processing apparatus according to an embodiment.

FIG. 7 is a flowchart illustrating a method of operating an image processing apparatus according to an embodiment. As shown in FIG. 7, a method 700 of operating the image processing apparatus may include a plurality of operations S700 to S780.

Referring to FIGS. 1 and 7, in operation S700, the first circuit 210 may detect whether the first frame section of the input signal is an abnormal signal AS. In an embodiment, the first circuit 210 may receive, from the image sensor 100, image data ID (as the input signal) including a plurality of frame sections, and may detect an abnormal signal AS based on the first frame section of the input signal.

When the first frame section of the input signal is not detected as an abnormal signal AS, in operation S710, the image processing apparatus 10 may generate an output image on the basis of the first frame section of the input signal. In an embodiment, the first circuit 210 may transmit the first frame section of the input signal to the second processor 320, and the second processor 320 may generate the output image based on the first frame section.

When the first frame section of the input signal is detected as an abnormal signal AS, operations S720 to S780 may be performed. In operation S720, the first circuit 210 may mask the second frame section of the input signal. In an embodiment, the image sensor 100 may continuously transmit an input signal including a plurality of frame sections to the first circuit 210. When an error occurs in the first frame section, a collision may occur when the first circuit 210 receives the subsequent frame section before recovering the error in the first frame section. During the recovery of the error in the first frame section, the first circuit 210 may mask the second frame section that is subsequent to the erroneous first frame section, thereby preventing such a collision.

In operation S740, the second circuit 220 may generate the fake signal FaS based on the first frame section of the input signal. In an embodiment, the second circuit 220 may generate data subsequent to the time point when the first circuit 210 detects the image data as the abnormal signal AS based on the data prior to the time point when the first circuit 210 detects the image data as an abnormal signal AS by using the register 221, and the generated data may be referred to as a fake signal FaS.

In operation S760, the second processor 320 may generate an output image based on the fake signal FaS. In an embodiment, the second processor 320 may receive the fake signal FaS and perform an image processing operation to generate an output image. Since the first frame section detected as the abnormal signal AS is recovered to the fake signal FaS and the output image is generated based on the fake signal FaS, the second processor 320 is not initialized and perform the image processing operation.

In operation S780, the first circuit 210 may receive the second frame section. In an embodiment, after the fake signal FaS is terminated, the first processor 310 may receive the control signal from the third circuit 230. The operation of the first circuit 210 may be controlled based on the control signal so that the first circuit 210 receives the masked second frame section.

Figure 8:
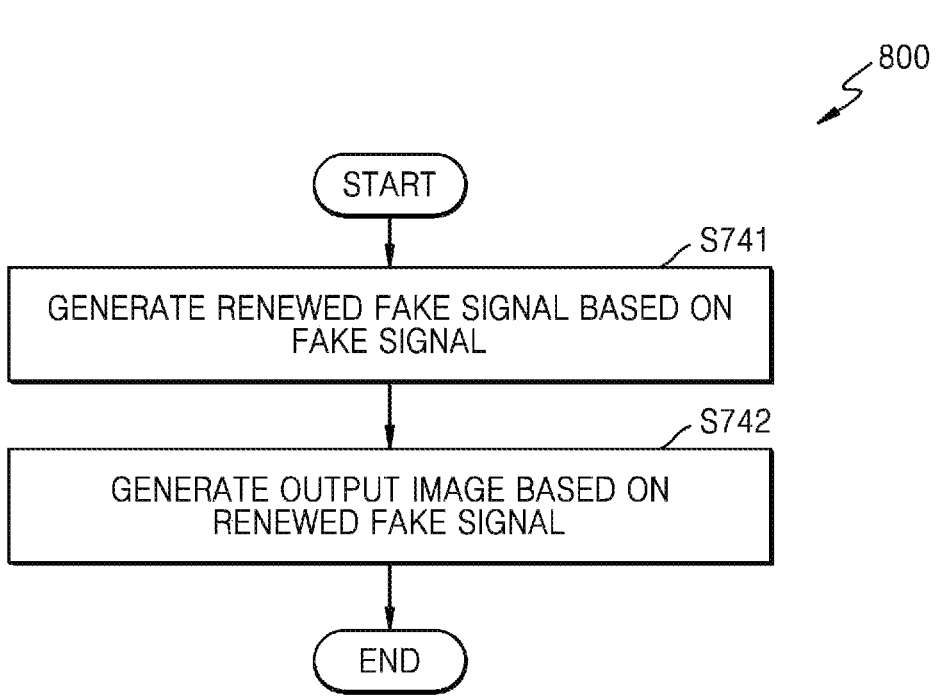
FIG. 8 is a flowchart illustrating a method of operating a fourth circuit according to an embodiment.

FIG. 8 is a flowchart illustrating a method of operating a fourth circuit according to an embodiment. As shown in FIG. 8, a method 800 of operating the fourth circuit may include a plurality of operations S741 and S742. In some embodiments, the method 800 of operating the fourth circuit may be performed between operations S740 and S760 of the method 700 of operating the image processing apparatus in FIG. 7.

Referring to FIG. 5 and FIG. 8, the fourth circuit 240 may generate the renewed fake signal RFaS based on the fake signal FaS in operation S741 after the fake signal FaS is generated in the operation S740 in FIG. 7. In some embodiments, when the second processor 320a receives data of a preset standard as an input, performance of the image processing apparatus 10a may be improved and the fourth circuit 240 may renew the fake signal FaS according to the standard determined by the second processor 320a and generate the renewed fake signal RFaS.

In operation S742, the second processor 320 may generate an output image based on the renewed fake signal RFaS. In some embodiments, since the fourth circuit 240 has renewed the fake signal FaS according to the standard of the input data requested by the second processor 320a, the quality of the output data image generated by the second processor 320 based on the renewed fake signal RFaS may be improved rather than the quality of the output data image generated by the second processor 320 based on the fake signal FaS.

Figure 9:
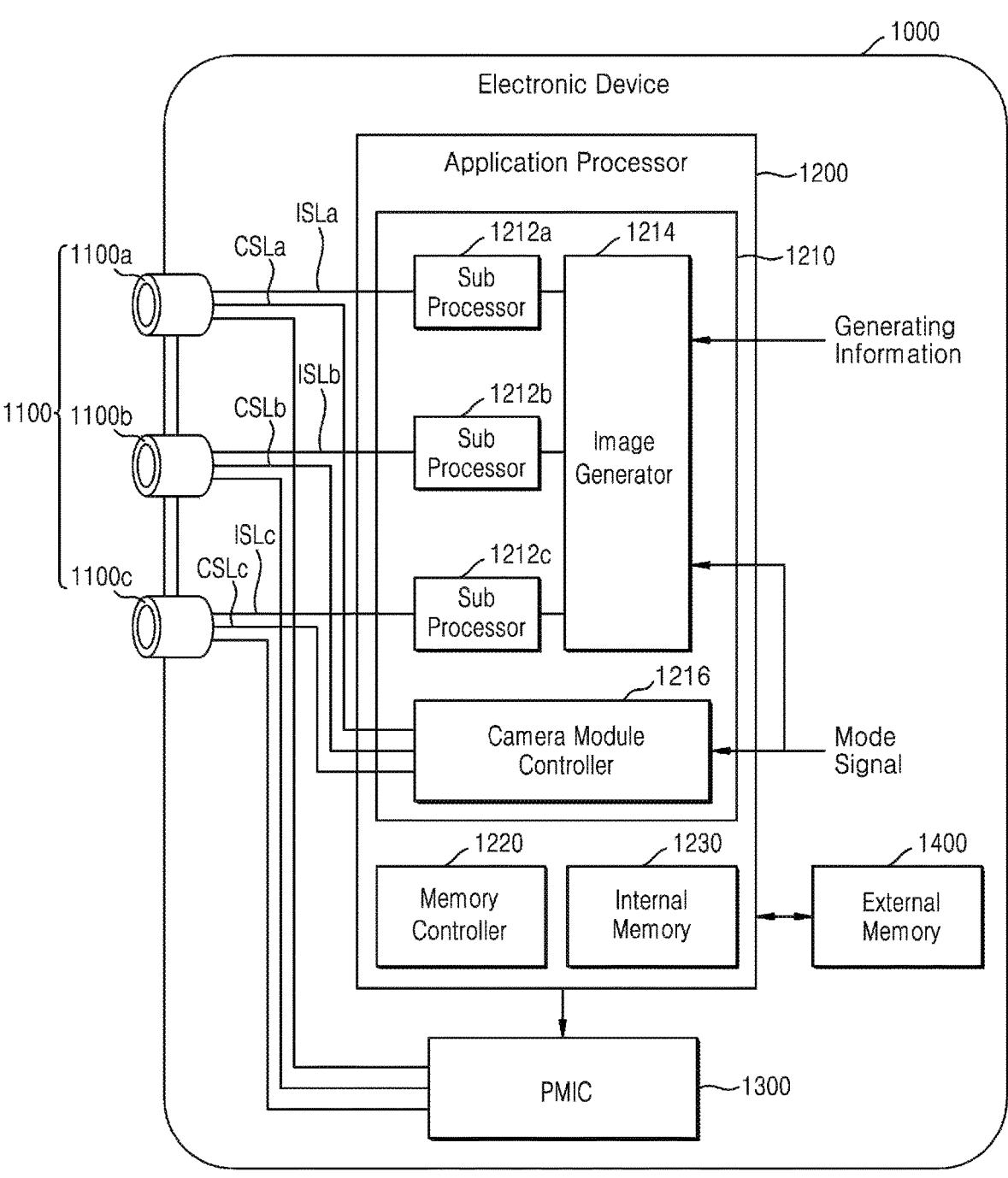
FIG. 9 is a block diagram of an electronic device including a multi-camera module.
Figure 10:
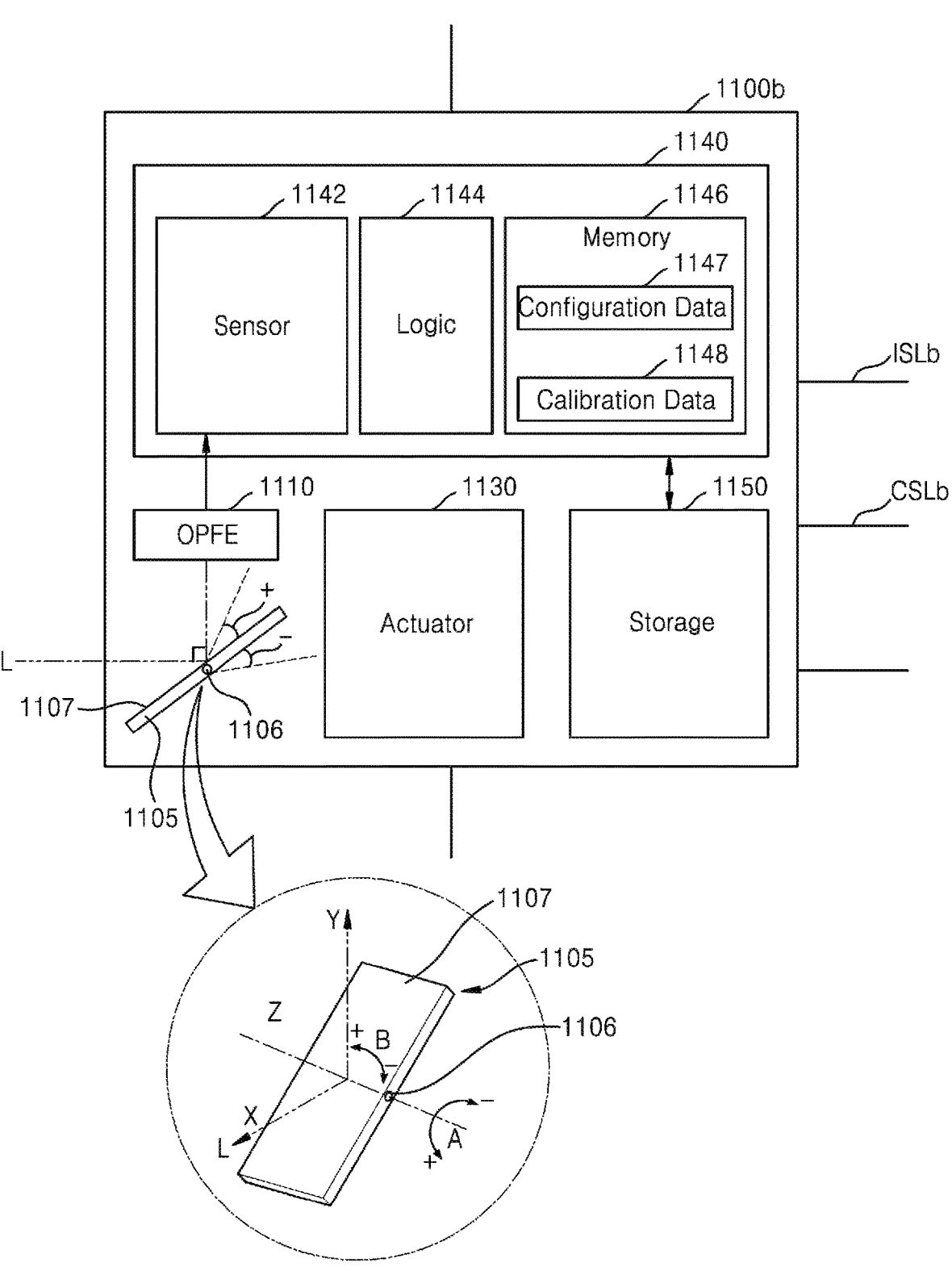
FIG. 10 is a detailed block diagram of the camera module of FIG. 9.

FIG. 9 is a block diagram of an electronic device including a multi-camera module. FIG. 10 is a detailed block diagram of the camera module of FIG. 9.

Referring to FIG. 9, an electronic device 1000 may include a camera module group 1100, an application processor 1200, a PMIC 1300, and an external memory 1400.

The camera module group 1100 may include a plurality of camera modules 1100a, 1100b, and 1100c. Although the embodiments show three camera modules 1100a, 1100b, 1100c, they are not limited thereto. In some embodiments, the camera module group 1100 may include two camera modules, or may be modified to include n camera modules (n is a natural number greater than or equal to 4).

Hereinafter, a detailed configuration of the camera module 1100b will be described in more detail with reference to FIG. 10, but the following description may be applied to other camera modules 1100a and 1100c according to an embodiment.

Referring to FIG. 10, the camera module 1100b may include a prism 1105, an optical path folding element (hereinafter, "OPFE") 1110, an actuator 1130, an image sensing device 1140, and a storage unit 1150.

The prism 1105 including a reflective surface 1107 of light reflecting material may deform the path of light L incident from the outside.

In some embodiments, the prism 1105 may change the path of the light L incident in a first direction X to a second direction Y perpendicular to the first direction X. Further, the prism 1105 may change the path of the light L incident in the first direction X to the second direction Y perpendicular to the first direction X by rotating the reflective surface 1107 of light reflecting material in A direction with respect to a central axis 1106 or rotating the reflective surface 1107 of the light reflecting material in B direction with respect to the central axis 1106. The OPFE 1110 may also move in a third direction Z perpendicular to the first direction X and the second direction Y.

In some embodiments, as shown, the maximum rotation angle of the prism 1105 in the A direction may be less than or equal to 15 degrees in the positive A direction, and may be greater than 15 degrees in the negative A direction, but the embodiments are not limited thereto.

In some embodiments, the prism 1105 may move within an angle of about 20 degrees, or between 10 degrees and 20 degrees, or between 15 degrees and 20 degrees in the positive or negative B direction, wherein the movement angle may indicate the same angle of movement in the positive and negative B directions or the similar angle within the range of 1 degree of movement in the positive and negative B directions.

In some embodiments, the prism 1105 may move the reflective surface 1107 of the light reflecting material in a third direction (e.g., Z direction) parallel to the extending direction of the central axis 1106.

In some embodiments, the camera module 1100b may include two or more prisms, so that the path of the light L incident in the first direction X may be changed into the second direction Y perpendicular to the first direction X, further into the first direction X or the third direction Z and further into the second direction Y.

The OPFE 1110 may, for example, include an optical lens comprising m groups, where m is a natural number. The m lenses may move in the second direction Y to change an optical zoom ratio of the camera module 1100b. For example, assuming that the basic optical zoom ratio of the camera module 1100b is Z, when the m optical lenses included in the OPFE 1110 are moved, the optical zoom ratios of the camera module 1100b may be changed to 3Z, 5Z, or 5Z or more.

The actuator 1130 may move the OPFE 1110 or an optical lens (hereinafter referred to as "optical lens") to a particular position. For example, for accurate sensing, the actuator 1130 may adjust the position of the optical lens to locate image sensor 1142 at the focal length of the optical lens.

The image sensing device 1140 may include the image sensor 1142, a control logic 1144, and a memory 1146. The image sensor 1142 may detect an image of an object for sensing by using the light L provided by the optical lens. The control logic 1144 may control the overall operation of the camera module 1100b and process the sensed image. For example, the control logic 1144 may control the operation of the camera module 1100b according to a control signal provided via a control signal line CSLb, and may extract image data (e.g., a face, an arm, and a leg of a person in the image) corresponding to a particular image from the sensed image. Control signals may also be provided via control signal lines CSLa and CSLc.

In some embodiments, the control logic 1144 may include the recovery circuit 200 in FIG. 1, and the recovery circuit 200 may include the first circuit 210, the second circuit 220, and the third circuit 230. After the image sensor 1142 senses the object for sensing, the first circuit 210 may receive the sensed image. The first circuit 210 may detect the sensed image as an abnormal signal AS, and the second circuit 220 may generate a fake signal FaS on the basis of the sensed image when the sensed image is detected as an abnormal signal AS. By processing the fake signal FaS instead of processing the sensed image that is an abnormal signal AS, it is possible to shorten the time for reset since the subsequent operation may be performed without initializing the control logic 1144.

The memory 1146 may store information necessary for the operation of the camera module 1100b, such as configuration data 1147 or calibration data 1148. The memory 1146 may store compressed configuration data and decompressed configuration data. The configuration data may include sensor calibration information including crosstalk (XTK), lens shielding correction (LSC), etc., FW TnP, sensor exposure time, gain, and the like. The calibration data 1148 necessary for the camera module 1100b to generate image data using light L provided from the outside may include, for example, information about degree of rotation, information about focal length, information about optical axis, and the like. When the camera module 1100b is implemented in the form of a multi-state camera of which the focal length varies depending on the position of the optical lens, the calibration data 1148 may include information about a focal length value for each location (or state) of the optical lens and auto-focusing.

The storage unit 1150 may store image data sensed by the image sensor 1142. The storage unit 1150 may be arranged outside the image sensing device 1140, and may be implemented in a stacked form with a sensor chip included in the image sensing device 1140. In some embodiments, the image sensor 1142 may be configured as a first chip and the control logic 1144, the storage unit 1150 and the memory 1142 are configured as a second chip, which are implemented in the form of two stacked chips.

In some embodiments, the storage unit 1150 may be implemented as an electrically erasable programmable read-only memory (EEPROM), but embodiments are not limited thereto. In some embodiments, the image sensor 1142 may be configured as a pixel array, and the control logic 1144 may include an analog to digital converter and an image signal processor for processing the sensed image.

Referring to FIGS. 9 and 10, in some embodiments, each of the plurality of camera modules 1100a, 1100b, and 1100c may include the actuator 1130. Accordingly, each of the plurality of camera modules 1100a, 1100b, 1100c may include the same or different calibration data 1148 according to the operation of the actuator 1130 included therein.

In some embodiments, one camera module (e.g., 1100b) of the plurality of camera modules 1100a, 1100b, and 1100c may be a folded-lens type camera module including the prism 1105 and the OPFE 1110 described above, and the other camera modules (e.g., 1100a and 1100c) may be vertical type camera modules neither including the prism 1105 nor the OPFE 1110, but are not limited thereto.

In some embodiments, one camera module (e.g., 1100c) of the plurality of camera modules 1100a, 1100b, and 1100c may be a vertical type depth camera that extracts depth data by using an infrared ray (IR). In this case, the application processor 1200 may merge image data provided from the depth camera with image data provided from another camera module (e.g., 1100a or 1100b) to generate a 3D depth image.

In some embodiments, at least two camera modules (e.g., 1100a and 1100b) of the plurality of camera modules 1100a, 1100b, and 1100c may have different fields of view. In this case, for example, the optical lenses of at least two of the plurality of camera modules 1100a, 1100b, and 1100c may be different, but are not limited thereto.

Further, in some embodiments, the fields of view of the plurality of camera modules 1100a, 1100b, and 1100c may be different. For example, the camera module 1100a may be an ultrawide camera, the camera module 1100b may be a wide camera, and the camera module 1100c may be a telecamera, but are not limited thereto. In this case, the optical lenses included in the plurality of camera modules 1100a, 1100b, and 1100c may also be different, but are not limited thereto.

In some embodiments, the plurality of camera modules 1100a, 1100b, 1100c may be physically separated from each other. In other words, the sensing area of one image sensor 1142 is not divided and used by the plurality of camera modules 1100a, 1100b, and 1100c, but the independent image sensor 1142 may be positioned inside each of the plurality of camera modules 1100a, 1100b, and 1100c.

Referring back to FIG. 9, the application processor 1200 may include an image processing apparatus 1210, a memory controller 1220, and an internal memory 1230. The application processor 1200 may be implemented separately from the plurality of camera modules 1100a, 1100b, and 1100c, for example, as separate semiconductor chips.

The image processing apparatus 1210 may include a plurality of sub-image processors 1212*a*, 1212*b*, and 1212*c*, an image generator 1214, and a camera module controller 1216.

The plurality of sub-image processors 1212*a*, 1212*b*, and 1212*c* may correspond to the plurality of camera modules 1100*a*, 1100*b*, and 1100*c*.

The image processing apparatus 1210 may further include a recovery circuit 200 (see FIG. 1), and the recovery circuit 200 may include a first circuit 210, a second circuit 220 and a third circuit 230. After the image sensor 1142 senses the object for sensing, the first circuit 210 may receive the sensed image. The first circuit 210 may detect the sensed image as an abnormal signal AS, and the second circuit 220 may generate a fake signal FaS on the basis of the sensed image when the sensed image is detected as an abnormal signal AS. By processing the fake signal FaS instead of processing the sensed image that is the abnormal signal AS, it is possible to shorten the time for reset since the subsequent operation may be performed without initializing the image processing apparatus 1210.

The image data generated from the camera module 1100*a* may be provided to the sub-image processor 1212*a* via image signal line ISLa, the image data generated from the camera module 1100*b* may be provided to the sub-image processor 1212*b* via image signal line ISLb, and the image data generated from the camera module 1100*c* may be provided to the sub-image processor 1212*c* via image signal line ISLc. Such image data transmission may be performed using, for example, a camera serial interface (CSI) based on a mobile industry processor interface (MIPI), but is not limited to.

In some embodiments, one sub-image processor may be arranged to correspond to a plurality of camera modules. For example, the sub-image processors 1212*a* and 1212*c* may not be separately implemented as shown, but may be integrated into one sub-image processor, and image data provided from the camera modules 1100*a* and 1100*c* may be selected by a selection device (e.g., a multiplexer) and then provided to the integrated sub-image processor. In this case, the sub-image processor 1212*b* may not be integrated, and may be provided with image data from the camera module 1100*b*.

Further, in some embodiments, the image data generated from the camera module 1100*a* may be provided to the sub-image processor 1212*a* via the image signal line ISLa, the image data generated from the camera modules 1100*b* may be provided to the sub-image processor 1212*b* via the image signal line ISLb, and the image data generated from the camera module 1100*c* may be provided to the sub-image processor 1212*c* via the image signal line ISLc. Further, the image data processed by the sub-image processor 1212*b* may be provided directly to the image generator 1214, but one of the image data processed by the sub-image processor 1212*a* and the image data processed by the sub-image processor 1212*c* may be selected by the selection device (e.g., a multiplexer) and then provided to the image generator 1214.

Each of the sub-image processors 1212*a*, 1212*b*, 1212*c* may perform image processing such as bad pixel correction, 3A correction (auto-focus correction, auto-white balance, auto exposure), noise reduction, sharpening, gamma control, and remosaic on the image data provided from the camera modules 1100*a*, 1100*b*, 1100*c*.

In some embodiments, the remosaic signal processing may be performed by the camera modules 1100*a*, 1100*b*, and

1100*c* and then provided to the sub-image processors 1212*a*, 1212*b*, and 1212*c*, respectively.

The image data processed by each of sub-image processors 1212*a*, 1212*b*, and 1212*c* may be provided to the image generator 1214. The image generator 1214 may generate an output image by using the image data provided from each of the sub-image processors 1212*a*, 1212*b*, and 1212*c* according to image generating information or a mode signal.

For example, the image generator 1214 may merge at least a part of the image data generated from the sub-image processors 1212*a*, 1212*b*, and 1212*c* according to the image generating information or mode signal to generate the output image. In addition, the image generator 1214 may generate the output image by selecting the image data generated from one of the sub0image processors 1212*a*, 1212*b*, and 1212*c* according to image generating information or mode signal.

In some embodiments, the image generating information may include a zoom signal or zoom factor. Further, in some embodiments, the mode signal may be, for example, a signal based on a mode selected from a user.

When the image generating information is a zoom signal or zoom factor and the camera modules 1100*a*, 1100*b*, and 1100*c* have different fields of view, the image generator 1214 may perform different operations according to the type of the zoom signal. For example, when the zoom signal is the first signal, the output image may be generated by using image data output from the sub-image processor 1212*b* and image data output from the sub-image processor 1212*a* among image data output from the sub-image processor 1212*a* and image data output from the sub-image processor 1212*c*. When the zoom signal is a second signal that is different from the first signal, the image generator 1214 may generate an output image by using image data output from the sub-image processor 1212*b* and image data output from the sub-image processor 1212*c* among image data output from the sub-image processor 1212*a* and image data output from the sub-image processor 1212*c*. When the zoom signal is a third signal different from the first and second signal, the image generator 1214 may select the image data output from one of the sub-image processors 1212*a*, 1212*b*, and 1212*c* to generate an output image without performing such image data merging.

While the inventive concept has been particularly shown and described with reference to embodiments thereof, it will be understood that various changes in form and details may be made thereto without departing from the spirit and scope of the inventive concept set forth in the following claims.

What is claimed is:

1. A recovery circuit comprising:

a first circuit configured to detect an abnormal signal based on an input signal and mask a signal subsequent to the abnormal signal when the input signal is detected as the abnormal signal;

a second circuit configured to receive the abnormal signal from the first circuit, to generate a fake signal in response to the abnormal signal, and to transmit the fake signal to a processor; and a third circuit configured to generate a control signal and transmit the control signal to the processor, the control signal comprising a first interrupting signal indicating detection of the abnormal signal and a second interrupting signal indicating termination of the fake signal;

wherein the processor performs an image processing operation based on the fake signal in response to the first interrupting signal, and controls the first circuit to receive the signal subsequent to the abnormal signal that was masked by the first circuit in response to the second interrupting signal.

2. The recovery circuit of claim 1, wherein the input signal comprises a frame signal including a plurality of frame sections, a line signal including at least one line section, and a pixel signal including at least one pixel section,
  wherein the first circuit is further configured to check each of the plurality of frame sections for the abnormal signal,
  and wherein the signal subsequent to the abnormal signal comprises a frame section subsequent to a frame section detected by the first circuit to include the abnormal signal.

3. The recovery circuit of claim 2, wherein the first circuit is further configured to detect that the input signal is the abnormal signal when a number of line sections corresponding to one frame section among the plurality of frame sections is less than or greater than a threshold number of line sections corresponding to the one frame section.

4. The recovery circuit of claim 2, wherein the first circuit is further configured to detect that the input signal is the abnormal signal when a data amount of the pixel section corresponding to the line section is less than or greater than a threshold data amount of the pixel section corresponding to the line section.

5. The recovery circuit of claim 2, wherein the first circuit is further configured to detect that the input signal is the abnormal signal when an interval between line sections corresponding to one frame section of the plurality of frame sections is shorter or longer than a threshold interval between line sections corresponding to the one frame section.

6. The recovery circuit of claim 2, wherein the first circuit is further configured to detect that the input signal is the abnormal signal when there is neither a line section nor a pixel section corresponding to one frame section of the plurality of frame sections, or when there is the line section or the pixel section between the frame sections.

7. The recovery circuit of claim 2, wherein the second circuit includes a register for storing data including a threshold number of line sections corresponding to each of the plurality of frame sections, a threshold interval between the line sections, and a threshold data amount of the pixel section,
  and wherein the fake signal comprises a frame section generated based on data stored in the register corresponding to a particular frame section when the first circuit detects the particular frame section as the abnormal signal.

8. The recovery circuit of claim 1, further comprising a fourth circuit configured to receive the fake signal from the second circuit, generate a renewed fake signal in response to the fake signal, and transmit the renewed fake signal to the processor.

9. The recovery circuit of claim 1, wherein the first circuit is further configured to operate in a first mode or in a second mode,
  wherein when the input signal is detected as the abnormal signal, the first circuit operates in the first mode, and
  when the input signal is not detected as the abnormal signal, the first circuit operates in the second mode, and transmits the input signal to the processor.

10. A method of operating an image processing apparatus including an image sensor, the method comprising:

receiving, by a recovery circuit, an input signal including a plurality of frame sections from the image sensor and detecting an abnormal signal in a first frame section of the input signal;
masking, by the recovery circuit, a second frame section of the input signal when the abnormal signal is detected in the first frame section;
generating, by the recovery circuit, a fake signal corresponding to the first frame section;
generating, by the recovery circuit, a first interrupting signal indicating detection of the abnormal signal;
generating, by a processor, an output image based on the fake signal in response to the first interrupting signal; and
generating, by the recovery circuit, a second interrupting signal indicating termination of the fake signal;
  wherein the processor ignores the first frame section and performs an image processing operation based on the fake signal in response to the first interrupting signal, and controls the recovery circuit to receive the second frame section in response to the second interrupting signal.

11. The method of claim 10, wherein the method further comprises ignoring, by the processor, the first frame section, in response to the first interrupting signal.

12. The method of claim 10, wherein the first frame section is detected as the abnormal signal when a number of line sections corresponding to the first frame section is less than or greater than a threshold number of line sections that correspond to the first frame section.

13. The method of claim 10, wherein the method further comprises generating a renewed fake signal in response to the fake signal and generating the output image in response to the renewed fake signal.

14. The method of claim 10, further comprising generating the output image based on the first frame section when the abnormal signal is not detected.

15. An image processing apparatus comprising:
  an image sensor configured to generate image data including a plurality of frame sections;
  a recovery circuit configured to receive the image data from the image sensor and generate output data based on the image data; and
  a processor configured to generate an output image based on the output data;
  wherein the recovery circuit includes a first circuit configured to detect an abnormal signal based on a first frame section of the image data and mask a second frame section subsequent to the first frame section when the first frame section is detected as the abnormal signal;
  a second circuit configured to receive the first frame section from the first circuit and generate a fake signal based on the first frame section; and
  a third circuit configured to generate a control signal, the control signal comprising a first interrupting signal indicating detection of the abnormal signal and a second interrupting signal indicating termination of the fake signal;
  wherein the processor ignores the first frame section and performs an image processing operation based on the fake signal in response to the first interrupting signal, and controls the first circuit to receive the second frame section in response to the second interrupting signal,
  wherein the output data includes the first frame section, the fake signal, and the control signal.

16. The image processing apparatus of claim 15, wherein the image data further comprises a line signal including at least one line section and a pixel signal including at least one pixel section, wherein the first circuit is further configured to detect the first frame section as the abnormal signal when there is neither a line section nor a pixel section corresponding to the first frame section.

17. The image processing apparatus of claim 15, further comprising a fourth circuit configured to receive the fake signal from the second circuit, generate a renewed fake signal based on the fake signal, and transmit the renewed fake signal to the processor, wherein the output data further includes the renewed fake signal.

18. The image processing apparatus of claim 15, wherein the first circuit is further configured to operate in a first mode or in a second mode, wherein when the first frame section is detected as the abnormal signal, the first circuit operates in the first mode, wherein when the first frame section is not detected as the abnormal signal, the first circuit operates in the second mode and receives the second frame section, and wherein the processor is further configured to generate the output image based on the first frame section.

* * * * *